United States Patent
Yokoyama et al.

(10) Patent No.: US 11,512,634 B2
(45) Date of Patent: Nov. 29, 2022

(54) TURBINE ROTOR BLADE, TURBOCHARGER, AND METHOD FOR PRODUCING TURBINE ROTOR BLADE

(71) Applicant: MITSUBISHI HEAVY INDUSTRIES ENGINE & TURBOCHARGER, LTD., Sagamihara (JP)

(72) Inventors: Takao Yokoyama, Tokyo (JP); Toru Hoshi, Tokyo (JP); Toyotaka Yoshida, Tokyo (JP); Keigo Sakamoto, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 136 days.

(21) Appl. No.: 16/960,146

(22) PCT Filed: Jan. 11, 2018

(86) PCT No.: PCT/JP2018/000478
§ 371 (c)(1),
(2) Date: Jul. 6, 2020

(87) PCT Pub. No.: WO2019/138497
PCT Pub. Date: Jul. 18, 2019

(65) Prior Publication Data
US 2021/0123380 A1   Apr. 29, 2021

(51) Int. Cl.
*F01D 5/04* (2006.01)
*F01D 5/14* (2006.01)
(Continued)

(52) U.S. Cl.
CPC ............... *F02C 6/12* (2013.01); *F01D 5/048* (2013.01); *F01D 5/145* (2013.01); *F02B 39/00* (2013.01);
(Continued)

(58) Field of Classification Search
CPC .. F02C 6/12; Y10T 29/49316; Y10T 29/4932; Y10T 29/49325; Y10T 29/49327;
(Continued)

(56) References Cited

U.S. PATENT DOCUMENTS 2,166,823 A * 7/1939 Rosenlocher ........... F01D 5/145
                                                      415/115
8,016,567 B2 * 9/2011 Praisner ................ F04D 29/684
                                                      416/231 A
(Continued)

FOREIGN PATENT DOCUMENTS

DE      10 2014 009 735 A1    1/2016
DE         102014009735 A1 *  1/2016  ............. B22F 10/20
(Continued)

OTHER PUBLICATIONS

DE-102014009735-A1 English translation (Year: 2014).*
(Continued)

*Primary Examiner* — Jason L Vaughan
*Assistant Examiner* — Amanda Kreiling
(74) *Attorney, Agent, or Firm* — Birch, Stewart, Kolasch & Birch, LLP

(57) ABSTRACT

A turbine rotor blade according to at least one embodiment of the present invention is to be connected to a rotational shaft so as to be rotatable around an axis and includes: a hub having a hub surface inclined with respect to the axis in a cross-section along the axis; at least one rotor blade disposed on the hub surface; and a connection passage disposed inside the turbine rotor blade and connecting a first opening disposed in the at least one rotor blade and a second opening disposed downstream of the first opening in the turbine rotor blade.

9 Claims, 10 Drawing Sheets

(51) Int. Cl.
*F02C 6/12* (2006.01)
*F02B 39/00* (2006.01)
*F04D 29/28* (2006.01)

(52) U.S. Cl.
CPC ........ *F04D 29/284* (2013.01); *F05D 2220/40* (2013.01); *F05D 2230/31* (2013.01); *F05D 2240/303* (2013.01); *F05D 2250/70* (2013.01)

(58) Field of Classification Search
CPC ......... Y10T 29/49332; Y10T 29/49336; Y10T 29/49337; Y10T 29/49339; Y10T 29/49341
See application file for complete search history.

(56) References Cited

U.S. PATENT DOCUMENTS

| | | | |
|---|---|---|---|
| 2004/0115044 A1 | 6/2004 | Osako et al. | |
| 2005/0147497 A1* | 7/2005 | Doerffer | F04D 29/324 416/231 R |
| 2010/0266385 A1 | 10/2010 | Praisner | |
| 2014/0099476 A1 | 4/2014 | Subramanian et al. | |
| 2015/0017013 A1 | 1/2015 | Tozzi et al. | |
| 2016/0160653 A1 | 6/2016 | Choi | |

FOREIGN PATENT DOCUMENTS

| | | |
|---|---|---|
| JP | 1-182600 A | 7/1989 |
| JP | 6-229202 A | 8/1994 |
| JP | 11-190201 A | 7/1999 |
| JP | 2003-129862 A | 5/2003 |
| JP | 2003-201802 A | 7/2003 |
| JP | 2015-510979 A | 4/2015 |
| JP | 2015-194137 A | 11/2015 |
| JP | 2016-502589 A | 1/2016 |
| WO | WO 2015/065659 A1 | 5/2015 |

OTHER PUBLICATIONS

English translation DE102014735 A1 (Year: 2016).*
International Preliminary Report on Patentability and Written Opinion of the International Searching Authority dated Jul. 23, 2020, for International Application No. PCT/JP2018/000478, with an English Translation.
International Search Report, dated Apr. 3, 2018, for International Applcation No. PCT/JP2018/000478.
Extended European Search Report dated Oct. 23, 2020 issued to the corresponding European Application No. 18899489.1.
Office Action dated Apr. 6, 2021, issued in counterpart Japanese Application No. 2019-564202 with an English Machine Translation.

* cited by examiner

TURBINE ROTOR BLADE, TURBOCHARGER, AND METHOD FOR PRODUCING TURBINE ROTOR BLADE

TECHNICAL FIELD

The present disclosure relates to a turbine rotor blade, a turbocharger, and a method for producing a turbine rotor blade.

BACKGROUND

In an engine used for automobiles or the like, in order to improve the output of the engine, an exhaust turbocharger is widely known in which a turbine is rotated by energy of exhaust gas of the engine, and intake air is compressed by a centrifugal compressor connected to the turbine via a rotational shaft, and is supplied to the engine.

An example of the turbine used for such an exhaust turbocharger is disclosed in Patent Document 1.

CITATION LIST

Patent Literature

Patent Document 1: JP2003-201802A
Patent Document 2: JP2003-129862A
Patent Document 3: JP2015-194137A
Patent Document 4: JP2016-502589A (translation of a PCT application)

SUMMARY

Problems to be Solved

This type of turbine has a plurality of blades radially arranged on the outer periphery of the hub, for example, as shown in Patent Document 1.

The efficiency of the turbine is represented by the theoretical velocity ratio (=U/C0), which is a ratio of the peripheral speed U at blade inlet to the maximum flow velocity for acceleration of working fluid (exhaust gas) at a certain turbine inlet temperature and pressure ratio, i.e., the theoretical velocity C0.

The efficiency of the turbine is maximum at a certain theoretical velocity ratio U/C0. The theoretical velocity C0 changes as the conditions of exhaust gas changes, that is, the temperature and pressure of exhaust gas change. In an engine used for automobiles or the like, since the operating state of the automobile frequently changes, the temperature and pressure of exhaust gas also frequently change.

When the theoretical velocity C0 changes, the inflow angle of exhaust gas that enters the leading edge of the blade changes, so that the angle difference between the leading edge and the exhaust gas inflow angle increases.

When the angle distance between the leading edge and the exhaust gas inflow angle increases, the inflowing exhaust gas is separated in the vicinity of the leading edge, resulting in a reduction in turbine efficiency.

Patent Documents 2 to 4 described above disclose techniques for producing a turbine blade of an axial-flow turbine of a gas turbine or a steam turbine by the metal additive manufacturing method. However, the inventions disclosed in these documents relate to production of a turbine blade of an axial-flow turbine with the metal additive manufacturing method, but do not disclose that the entire axial-flow turbine including a rotor is produced in an integrated manner.

In view of the above, an object of at least one embodiment of the present invention is to provide a turbine rotor blade, a turbocharger, and a method for producing a turbine rotor blade whereby it is possible to prevent separation of inflowing working fluid in the vicinity of the leading edge and suppress a reduction in turbine efficiency.

Solution to the Problems (1) A turbine rotor blade according to at least one embodiment of the present invention is a turbine rotor blade to be connected to a rotational shaft so as to be rotatable around an axis, comprising: a hub having a hub surface inclined with respect to the axis in a cross-section along the axis; at least one rotor blade disposed on the hub surface; and a connection passage disposed inside the turbine rotor blade and connecting a first opening disposed in the at least one rotor blade and a second opening disposed downstream of the first opening in the turbine rotor blade.

With the above configuration (1), the first opening disposed in the rotor blade and the second opening disposed downstream of the first opening in the turbine rotor blade are connected by the connection passage inside the turbine rotor blade. Further, since the second opening is disposed downstream of the first opening, the pressure of working fluid in the first opening is higher than the pressure of working fluid in the second opening. Accordingly, working fluid in the vicinity of the first opening is taken through the first opening and discharged through the second opening via the connection passage. Therefore, as working fluid in the vicinity of the first opening is taken through the first opening, separation of working fluid from the blade surface in the vicinity of the first opening is suppressed. Consequently, it is possible to suppress a reduction in turbine efficiency regardless of the theoretical velocity ratio U/C0.

(2) In some embodiments, in the above configuration (1), when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the first opening is disposed in the leading-edge-side region of the rotor blade, and the second opening is disposed in the trailing-edge-side region of the rotor blade.

The separation of working fluid from the blade surface due to the change in theoretical velocity ratio U/C0 is likely to occur in the vicinity of the leading edge of the rotor blade. In this regard, with the above configuration (2), since the first opening is disposed in the leading-edge-side region, it is possible to suppress separation of working fluid from the blade surface in the leading-edge-side region. Further, since the second opening is disposed in the trailing-edge-side region, the pressure of working fluid in the second opening is reduced compared with the case where the second opening is disposed in the leading-edge-side region of the rotor blade, so that the difference in pressure from the first opening increases. Thus, working fluid taken through the first opening is effectively discharged from the second opening.

If the second opening is disposed in the leading-edge-side region of the rotor blade, working fluid discharged from the second opening may promote separation of working fluid from the blade surface in the leading-edge-side region. However, in the above configuration, since the second opening is disposed in the trailing-edge-side region of the rotor blade, it is possible to prevent working fluid discharged from the second opening from promoting separation of working fluid from the blade surface in the leading-edge-side region.

(3) In some embodiments, in the above configuration (1) or (2), the second opening includes an edge surface opening disposed on an edge surface of a trailing edge of the at least one rotor blade.

On the downstream side of the trailing edge along the flow of working fluid, loss may occur due to wake, or wake flow.

In this regard, with the above configuration (3), since the second opening includes the edge surface opening disposed on the edge surface of the trailing edge of the rotor blade, development of the wake flow is prevented by working fluid discharged from the edge surface opening. Thus, it is possible to suppress the occurrence of wake.

(4) In some embodiments, in the above configuration (1) or (2), the at least one rotor blade includes a first rotor blade and a second rotor blade adjacent to a suction side of the first rotor blade, and the second opening includes a blade surface opening disposed on a blade surface on the suction side of the first rotor blade at a position adjacent to a trailing edge of the first rotor blade with respect to a throat portion at which the first rotor blade is closest to a pressure side of the second rotor blade.

At the blade surface on the suction side adjacent to the trailing edge with respect to the throat portion, working fluid easily separates from the blade surface. When working fluid separates from the blade surface on the suction side adjacent to the trailing edge with respect to the throat portion, the occurrence of wake may be enhanced, and loss may increase.

In this regard, with the above configuration (4), since the second opening includes the blade surface opening disposed on a blade surface on the suction side of the first rotor blade at a position adjacent to the trailing edge with respect to the throat portion at which the first rotor blade is closest to the pressure side of the second rotor blade, it is possible to suppress separation of working fluid from the blade surface on the suction side adjacent to the trailing edge with respect to the throat portion by working fluid discharged from the blade surface opening. Thus, it is possible to suppress the occurrence of wake.

(5) In some embodiments, in the above configuration (4), the second opening includes an edge surface opening disposed on an edge surface of a trailing edge of the at least one rotor blade, and the blade surface opening.

As described above, on the downstream side of the trailing edge along the flow of working fluid, loss may occur due to wake flow.

In this regard, with the above configuration (5), since the second opening includes the edge surface opening disposed on the edge surface of the trailing edge of the rotor blade, it is possible to further suppress the occurrence of wake by working fluid discharged from the edge surface opening.

(6) In some embodiments, in any one of the above configurations (1) to (5), when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the second opening is disposed in the trailing-edge-side region of the rotor blade, and the second opening is disposed at a position closer to the hub surface than a spanwise center position of the rotor blade.

Generally, the thickness of the rotor blade increases toward the hub surface along the spanwise direction. Thus, the wake flow is likely to occur near the hub surface in the spanwise direction on the downstream side of the trailing edge with respect to the working fluid flow.

In this regard, with the above configuration (6), since the second opening is formed at a position closer to the hub surface than the spanwise center position of the rotor blade in the trailing-edge-side region, development of the wake flow is prevented by working fluid discharged from the second opening. Thus, it is possible to effectively suppress the occurrence of wake.

(7) In some embodiments, in the above configuration (1), when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the first opening is disposed in the leading-edge-side region of the rotor blade, and the second opening is disposed on a tip surface of the hub.

On the downstream side of the tip surface of the hub, working fluid flowing along the rotor blade flows so as to wrap around the tip surface of the hub, so that the wake is more likely to occur.

In this regard, with the above configuration (7), since the second opening is formed on the tip surface of the hub, it is possible to effectively suppress the occurrence of wake by working fluid discharged from the second opening.

(8) In some embodiments, in any one of the above configurations (1) to (7), the first opening is formed on a blade surface on a suction side of the at least one rotor blade.

As the theoretical velocity ratio U/C0 decreases, the relative flow of working fluid inclines toward the pressure side, so that separation from the blade surface easily occurs on the suction side.

In this regard, with the above configuration (8), since the first opening is formed on a blade surface on the suction side of the rotor blade, it is possible to effectively suppress separation of working fluid from the blade surface on the suction side.

(9) In some embodiments, in any one of the above configurations (1) to (7), the first opening is formed on a blade surface on a pressure side of the at least one rotor blade.

As the theoretical velocity ratio U/C0 increases, the relative flow of working fluid inclines toward the suction side, so that separation from the blade surface easily occurs on the pressure side.

In this regard, with the above configuration (9), since the first opening is formed on a blade surface on the pressure side of the rotor blade, it is possible to effectively suppress separation of working fluid from the blade surface on the pressure side.

(10) In some embodiments, in any one of the above configurations (1) to (9), when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the first opening is disposed in the leading-edge-side region of the rotor blade, and the first opening is disposed at a position father from the hub surface than a spanwise center position of the rotor blade.

It is known that separation of working fluid entering the turbine rotor blade in the vicinity of the leading edge is more likely to occur with distance from the hub surface along the spanwise direction.

In this regard, with the above configuration (10), since the first opening is formed at a position farther from the hub surface than the spanwise center position of the rotor blade in the leading-edge-side region, it is possible to effectively suppress separation of working fluid in the vicinity of the leading edge.

(11) In some embodiments, in any one of the above configurations (1) to (10), an opening area of the first opening is larger than an opening area of the second opening.

In order to effectively suppress separation of working fluid entering the turbine rotor blade in the vicinity of the leading edge, it is preferred that the first opening has a large opening area. However, when the first opening has a large opening area, more working fluid flows from the first opening into the connection passage. As a result, working fluid that does not provide kinetic energy to the turbine rotor blade may increase, and the turbine efficiency may decrease.

In this regard, with the above configuration (11), since the opening area of the first opening is larger than the opening area of the second opening, i.e., the opening area of the second opening is smaller than the opening area of the first opening, it is possible to reduce the flow rate of working fluid flowing from the first opening into the connection passage, compared with the case where the opening area of the second opening is equal to the opening area of the first opening. Accordingly, since the flow rate of working fluid flowing from the first opening into the connection passage is reduced while effectively suppressing separation of working fluid entering the turbine rotor blade in the vicinity of the leading edge, it is possible to effectively suppress a reduction in turbine efficiency.

(12) A turbocharger according to at least one embodiment of the present invention comprises: a rotational shaft; a compressor wheel connected to one end of the rotational shaft; and a turbine rotor blade connected to another end of the rotor shaft, and the turbine rotor blade is the turbine rotor blade having any one of the above configurations (1) to (11).

With the above configuration (12), since the turbine rotor blade having the above configuration (1) is included, it is possible to suppress a reduction in turbine efficiency of the turbocharger.

(13) A method for producing a turbine rotor blade according to at least one embodiment of the present invention is to produce the turbine rotor blade having any one of the above configurations (1) to (11), and comprises depositing layers of metallic powder to integrally form the hub and the rotor blade in which at least a part of the connection passage is disposed.

For instance, when a turbine rotor blade is produced by precision casting, wax is injected into a mold to produce a wax model. Since the wax model needs to be removed from the mold, a passage corresponding to the connection passage cannot be provided inside the part of the wax model corresponding to the rotor blade so as to extend in a direction intersecting a direction in which the mold is detached. Accordingly, it is difficult to produce the turbine rotor blade that includes the connection passage disposed inside the rotor blade and connecting the first opening disposed in the rotor blade and the second opening disposed downstream of the first opening as in the above configuration (1) by precision casting.

In this regard, with the above method (13), since the hub and the rotor blade in which at least a part of the connection passage is disposed are integrally formed by depositing layers of metallic powder, the turbine rotor blade with the above configuration (1) can be produced.

Advantageous Effects

According to at least one embodiment of the present invention, it is possible to suppress a reduction in turbine efficiency.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
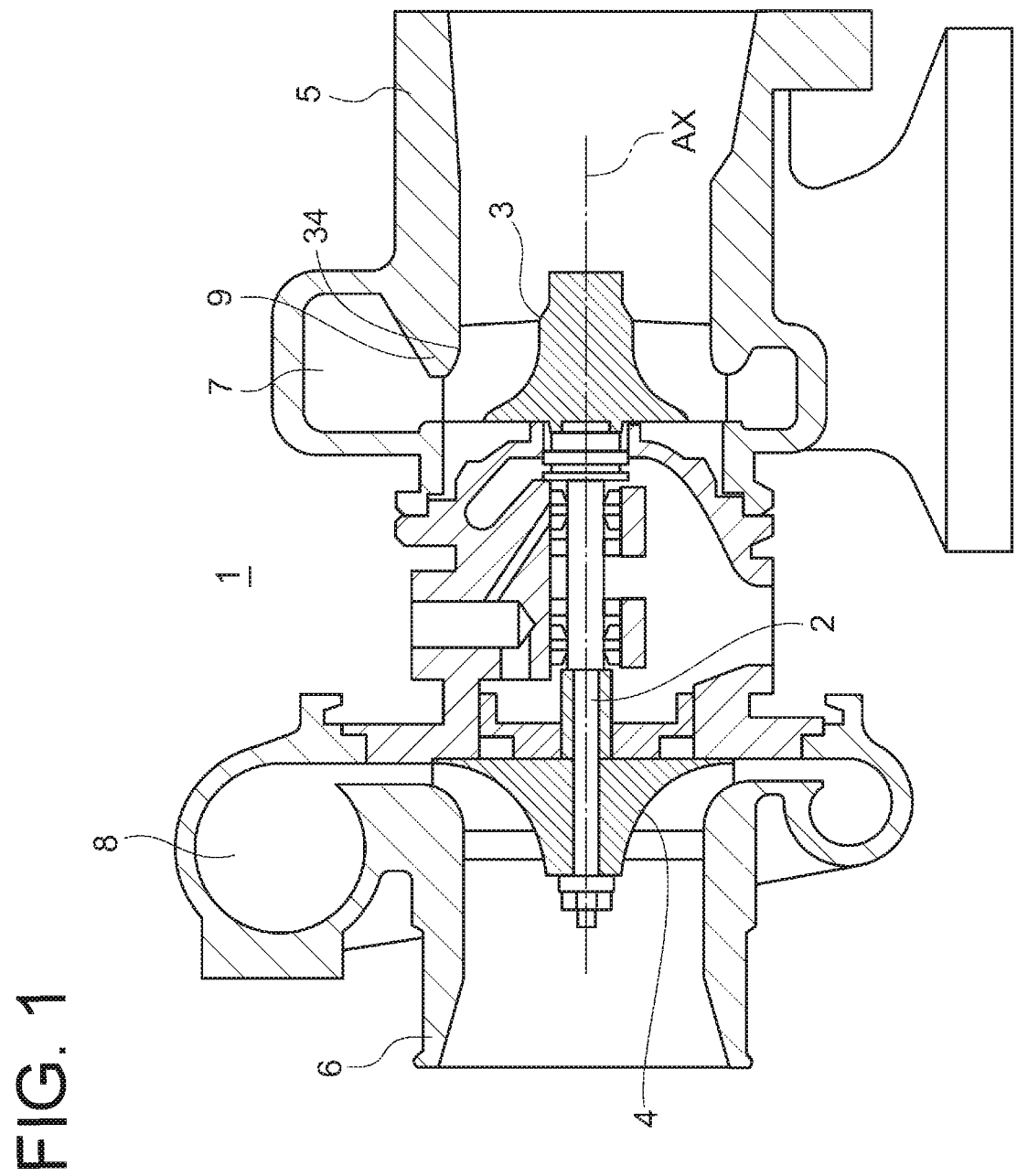
FIG. 1 is a cross-sectional view illustrating an example of a turbocharger according to some embodiments.

FIG. 1 is a cross-sectional view illustrating an example of a turbocharger 1 according to some embodiments.

The turbocharger 1 according to some embodiments is a device for supercharging air to an engine mounted on a vehicle such as an automobile.

The turbocharger 1 includes a turbine wheel (turbine rotor blade) 3 and a compressor wheel 4 which are connected via a rotor shaft 2 which is a rotational shaft, a turbine housing 5 accommodating the turbine rotor blade 3, and a compressor housing 6 accommodating the compressor wheel 4. The turbine housing 5 has a scroll 7. The compressor housing 6 has a scroll 8.

On the outer peripheral side of the turbine rotor blade 3 of the turbine housing 5, a shroud 9 is formed so as to cover the turbine rotor blade 3.

Figure 2:
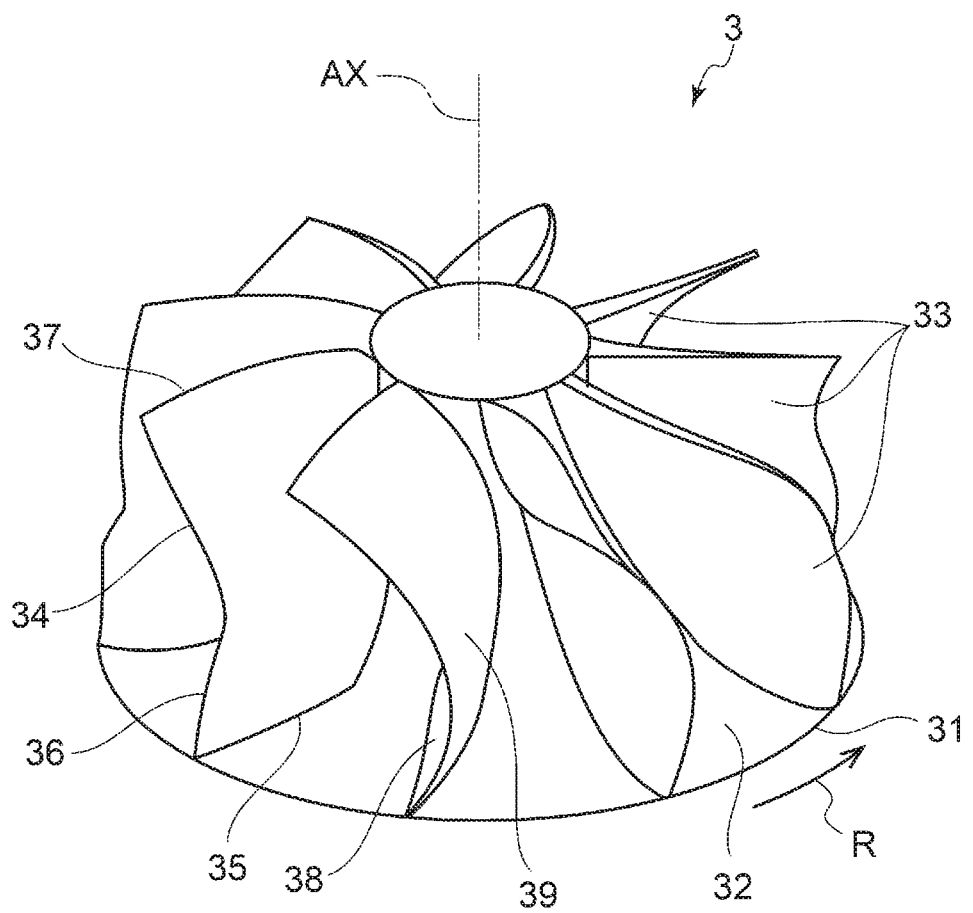
FIG. 2 is a perspective view of a turbine rotor blade according to some embodiments.

FIG. 2 is a perspective view of the turbine rotor blade 3 according to some embodiments.

The turbine rotor blade 3 according to some embodiments is connected to the rotor shaft (rotational shaft) 2 so as to be rotatable around an axis AX. The turbine rotor blade 3 according to some embodiments includes a hub 31 having a hub surface 32 inclined with respect to the axis AX in a cross-section along the axis AX and a plurality of rotor blades 33 arranged on the hub surface 32. Although the turbine rotor blade 3 shown in FIG. 2 is a radial turbine, it may be a mixed flow turbine. Further, a first opening and a second opening described later are omitted in FIG. 2. In FIG. 2, the arrow R indicates the rotation direction of the turbine rotor blade 3. The rotor blades 33 are arranged at intervals in the circumferential direction of the turbine rotor blade 3.

In the turbocharger 1 having this configuration, exhaust gas as working fluid flows from a leading edge 36 to a trailing edge 37 of the turbine rotor blade 3.

As described above, the efficiency of the turbine is represented by the theoretical velocity ratio (=U/C0), which is a ratio of the peripheral speed U at blade inlet to the maximum flow velocity for acceleration of exhaust gas at a certain turbine inlet temperature and pressure ratio, i.e., the theoretical velocity C0, and the efficiency is maximum at a certain theoretical velocity ratio U/C0.

In a vehicle such as an automobile on which an engine using the turbocharger 1 is mounted, the operating state frequently changes, so that the temperature and pressure of exhaust gas also frequently change. Accordingly, the theoretical velocity C0 frequently changes, and the theoretical velocity ratio U/C0 also frequently changes.

Figure 3:
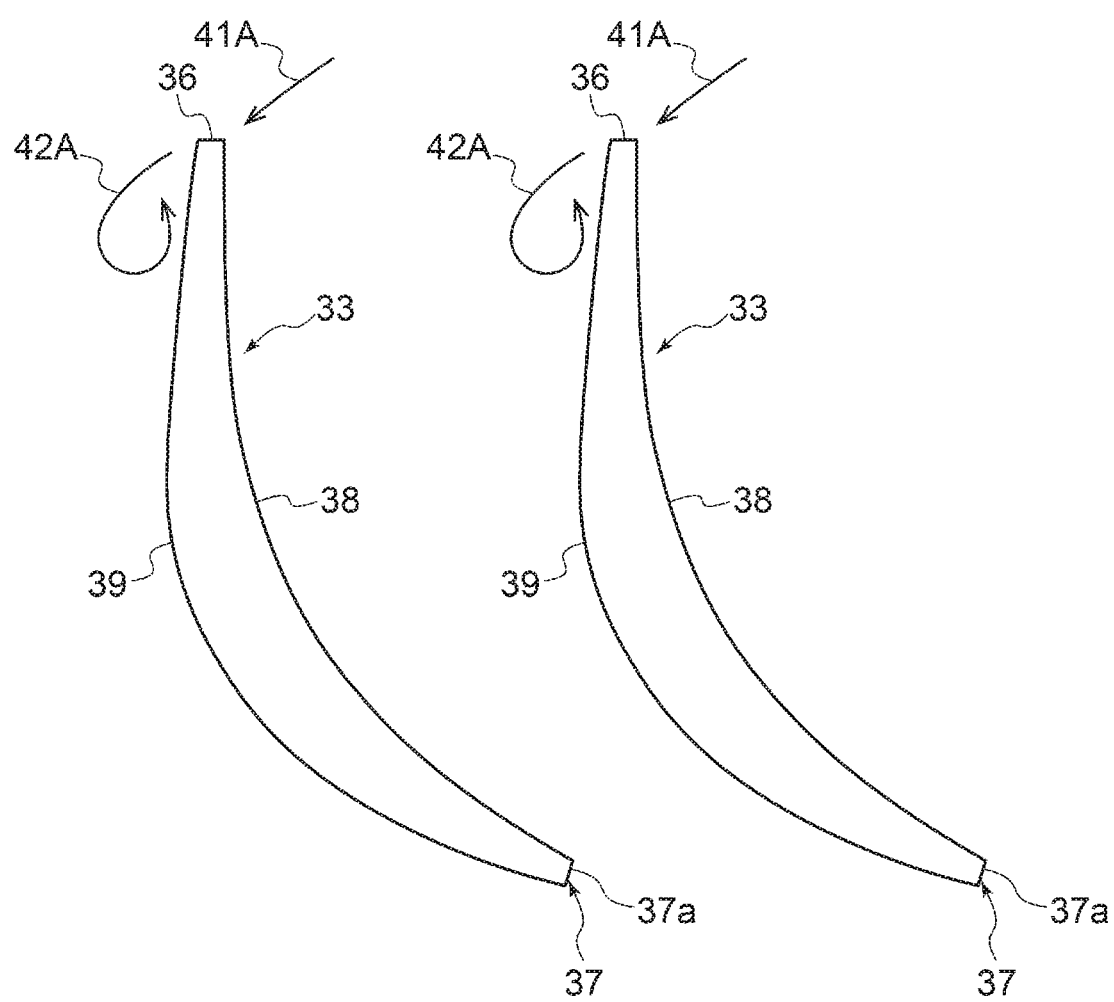
FIG. 3 is a schematic diagram showing the flow of exhaust gas flowing into the leading edge of the rotor blade when the theoretical velocity ratio U/C0 is small.
Figure 4:
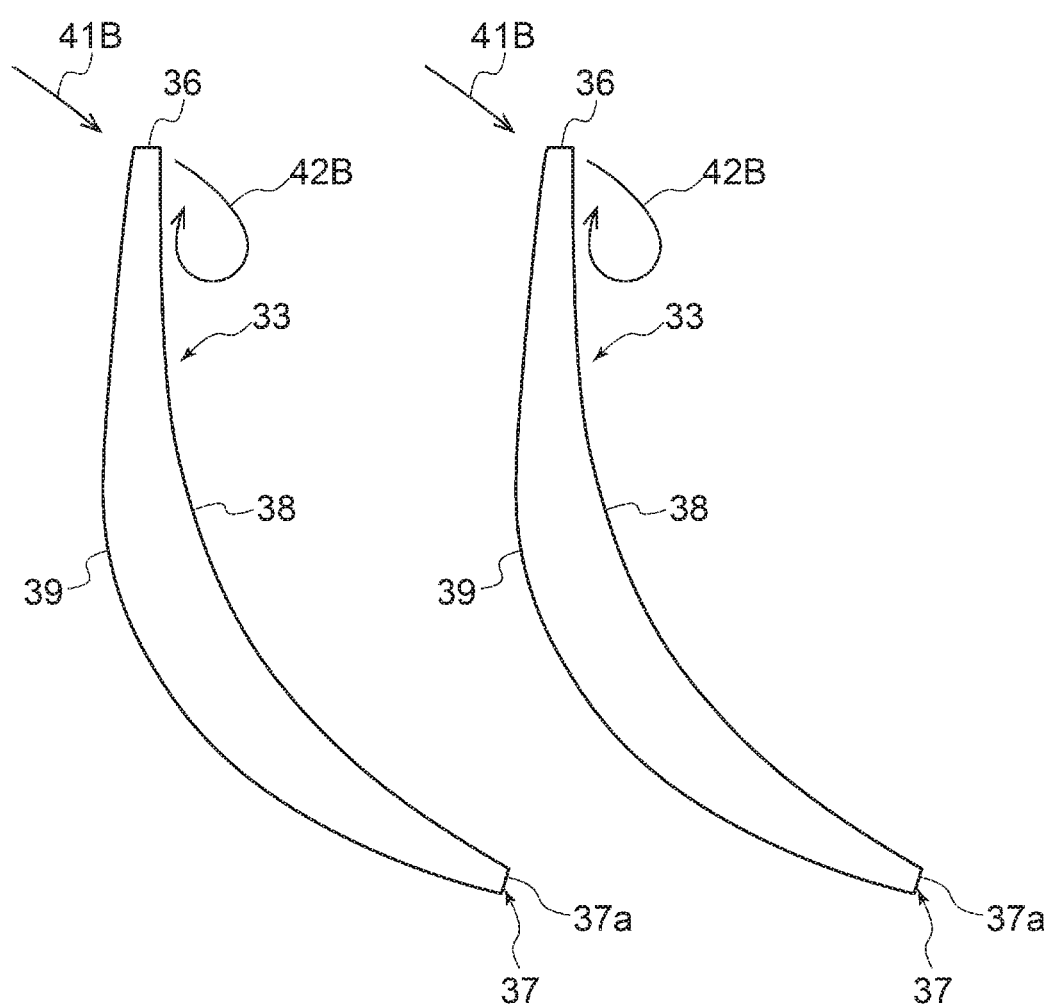
FIG. 4 is a schematic diagram showing the flow of exhaust gas flowing into the leading edge of the rotor blade when the theoretical velocity ratio U/C0 is large.

FIG. 3 is a schematic diagram showing the flow of exhaust gas flowing into the leading edge 36 of the rotor blade 33 when the theoretical velocity ratio U/C0 is small. FIG. 4 is a schematic diagram showing the flow of exhaust gas flowing into the leading edge 36 of the rotor blade 33 when the theoretical velocity ratio U/C0 is large. FIGS. 3 and 4 show a cross-section of the rotor blade 33 along the direction of main flow of exhaust gas along a blade surface of the rotor blade 33.

For example, when the theoretical velocity ratio U/C0 is small, the inflow angle of exhaust gas flowing into the leading edge 36 of the rotor blade 33 inclines toward the pressure side 38, as shown by the arrow 41A in FIG. 3. In other words, as the theoretical velocity ratio U/C0 is smaller, the exhaust gas flow has larger components toward the pressure side 38. As a result, exhaust gas entering the leading edge 36 of the rotor blade 33 is separated at the suction side 39 in the vicinity of the leading edge 36, as indicated by the arrow 42A. As the separation region caused by such separation is enlarged, the turbine efficiency is reduced.

Conversely, for example, when the theoretical velocity ratio U/C0 is large, the inflow angle of exhaust gas flowing into the leading edge 36 of the rotor blade 33 inclines toward the suction side 39, as shown by the arrow 41B in FIG. 4. In other words, as the theoretical velocity ratio U/C0 is larger, the exhaust gas flow has larger components toward the suction side 39. As a result, exhaust gas entering the leading edge 36 of the rotor blade 33 is separated at the pressure side 38 in the vicinity of the leading edge 36, as indicated by the arrow 42B. As the separation region caused by such separation is enlarged, the turbine efficiency is reduced.

Therefore, in the turbine rotor blade 3 according to some embodiments, a first opening 11 for suction of exhaust gas is formed, on a blade surface of the rotor blade 33, in the vicinity of a region where separation easily occurs as described above, and exhaust gas in the vicinity of the first opening 11 is taken through the first opening 11 to suppress separation of exhaust gas from the blade surface in the vicinity of the first opening 11. Further, the exhaust gas taken through the first opening 11 is discharged through a second opening 12 disposed downstream of the first opening 11 along the main flow of exhaust gas via a connection passage 10 disposed inside the turbine rotor blade 3. Hereinafter, the first opening 11, the second opening 12, and the connection passage 10 of the turbine rotor blade 3 according to some embodiments will be described.

FIGS. 5 to 10 are schematic diagrams showing the shape of the rotor blade 33 according to an embodiment.

Figure 5:
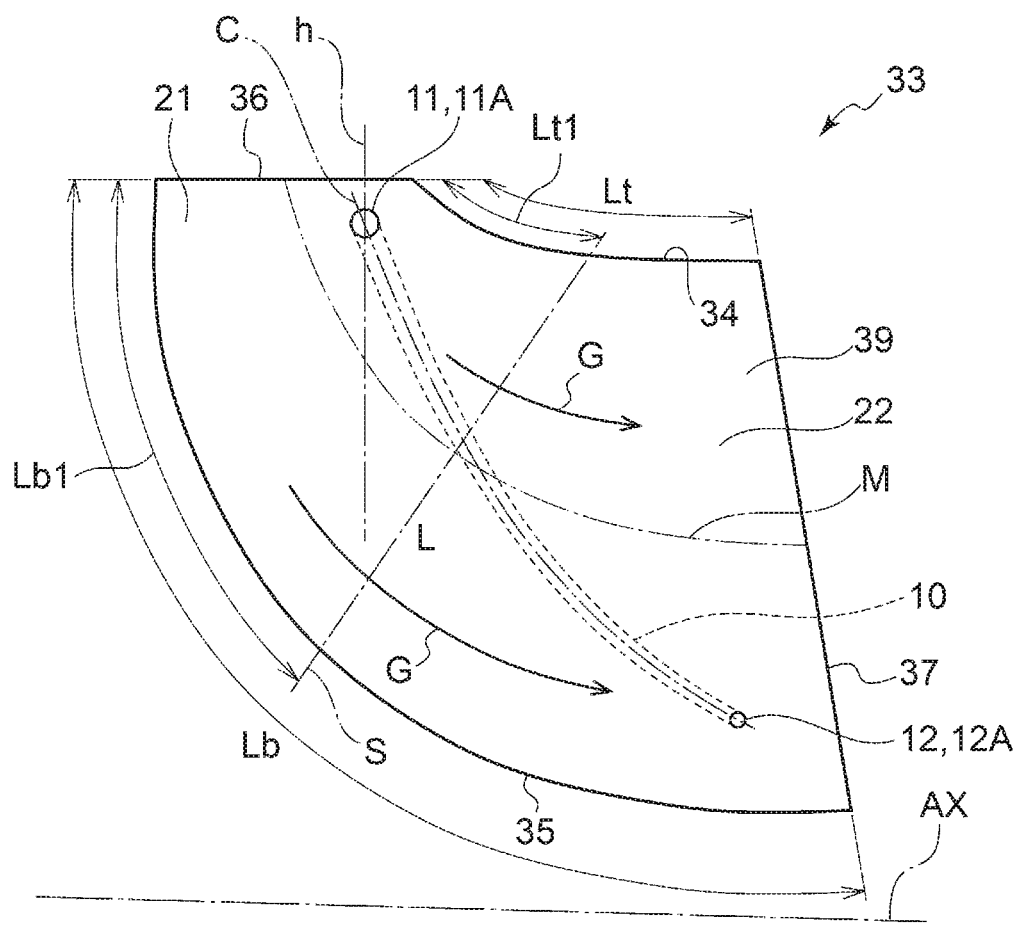
FIG. 5 is a schematic diagram showing the shape of a rotor blade 33 according to an embodiment.
Figure 6:
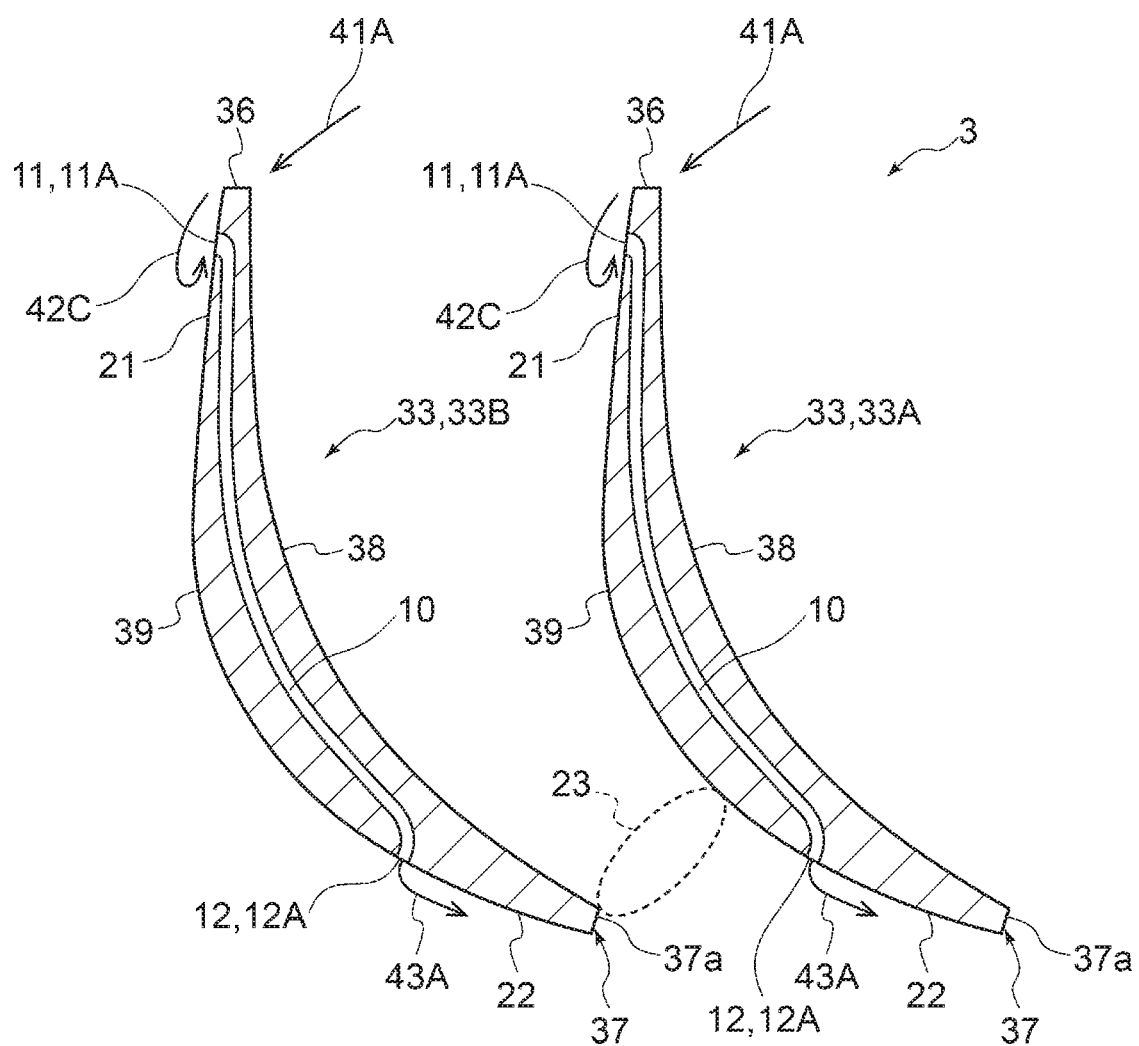
FIG. 6 is a schematic diagram showing the shape of a rotor blade 33 according to an embodiment.
Figure 7:
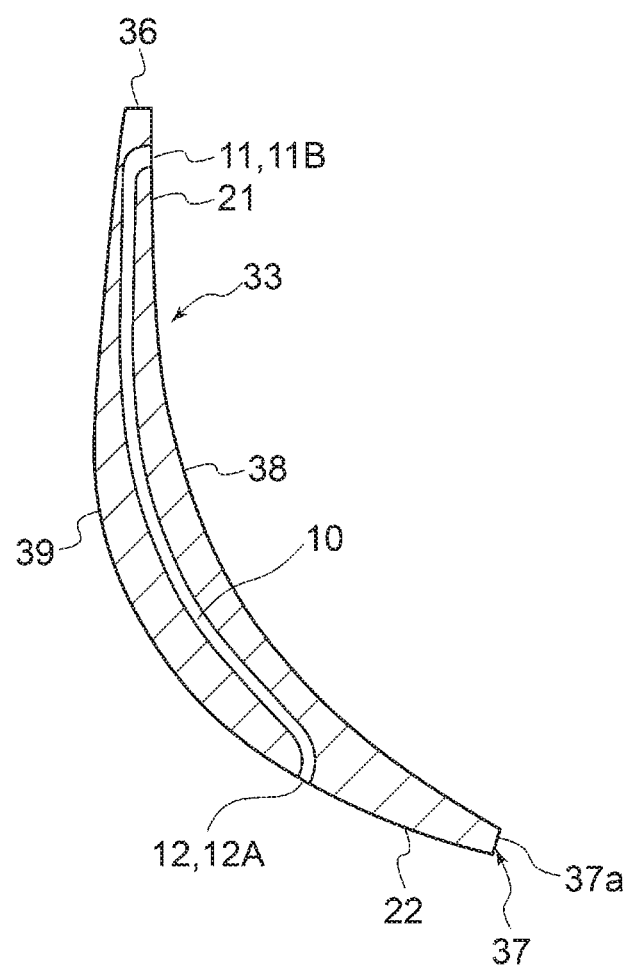
FIG. 7 is a schematic diagram showing the shape of a rotor blade 33 according to an embodiment.
Figure 8:
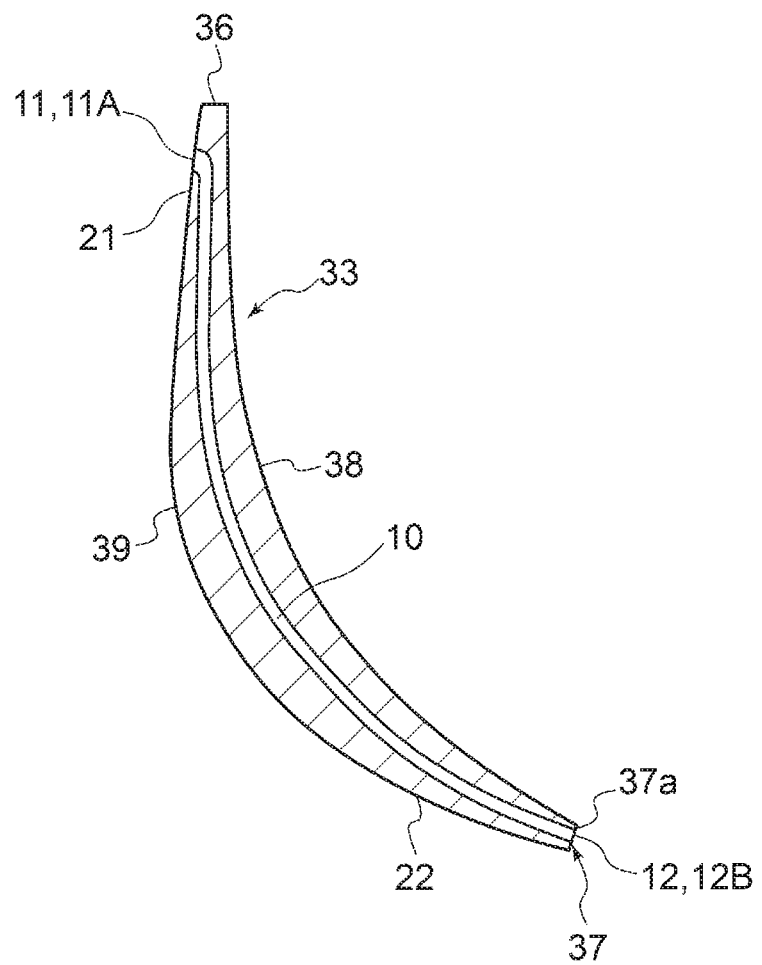
FIG. 8 is a schematic diagram showing the shape of a rotor blade 33 according to an embodiment.
Figure 9:
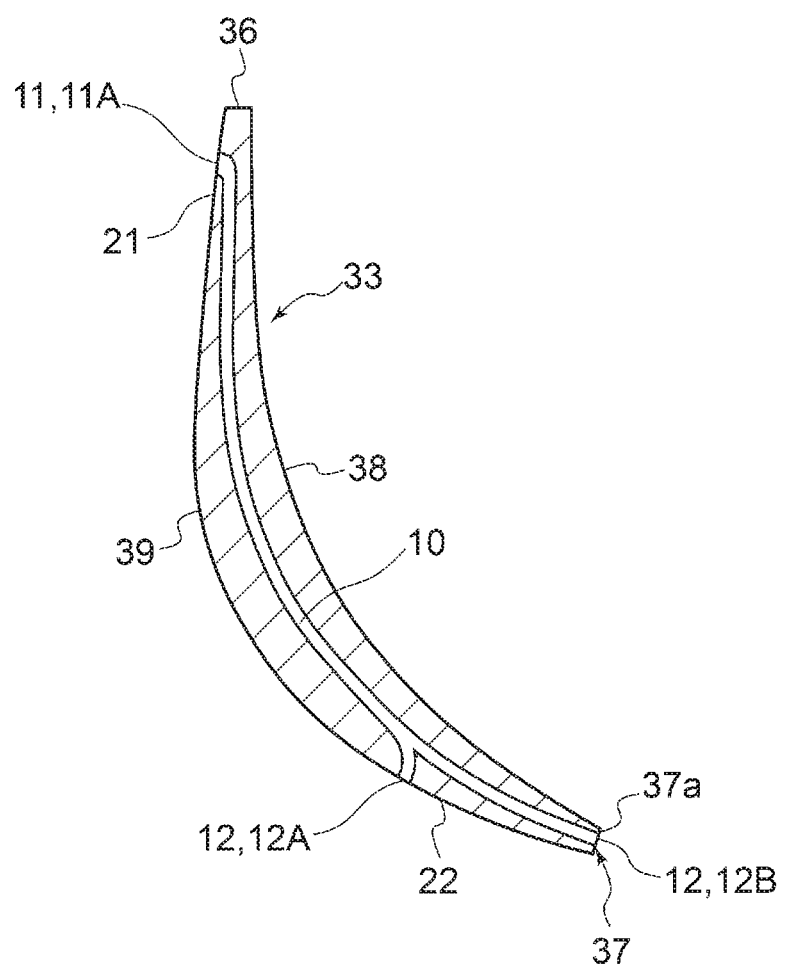
FIG. 9 is a schematic diagram showing the shape of a rotor blade 33 according to an embodiment.
Figure 10:
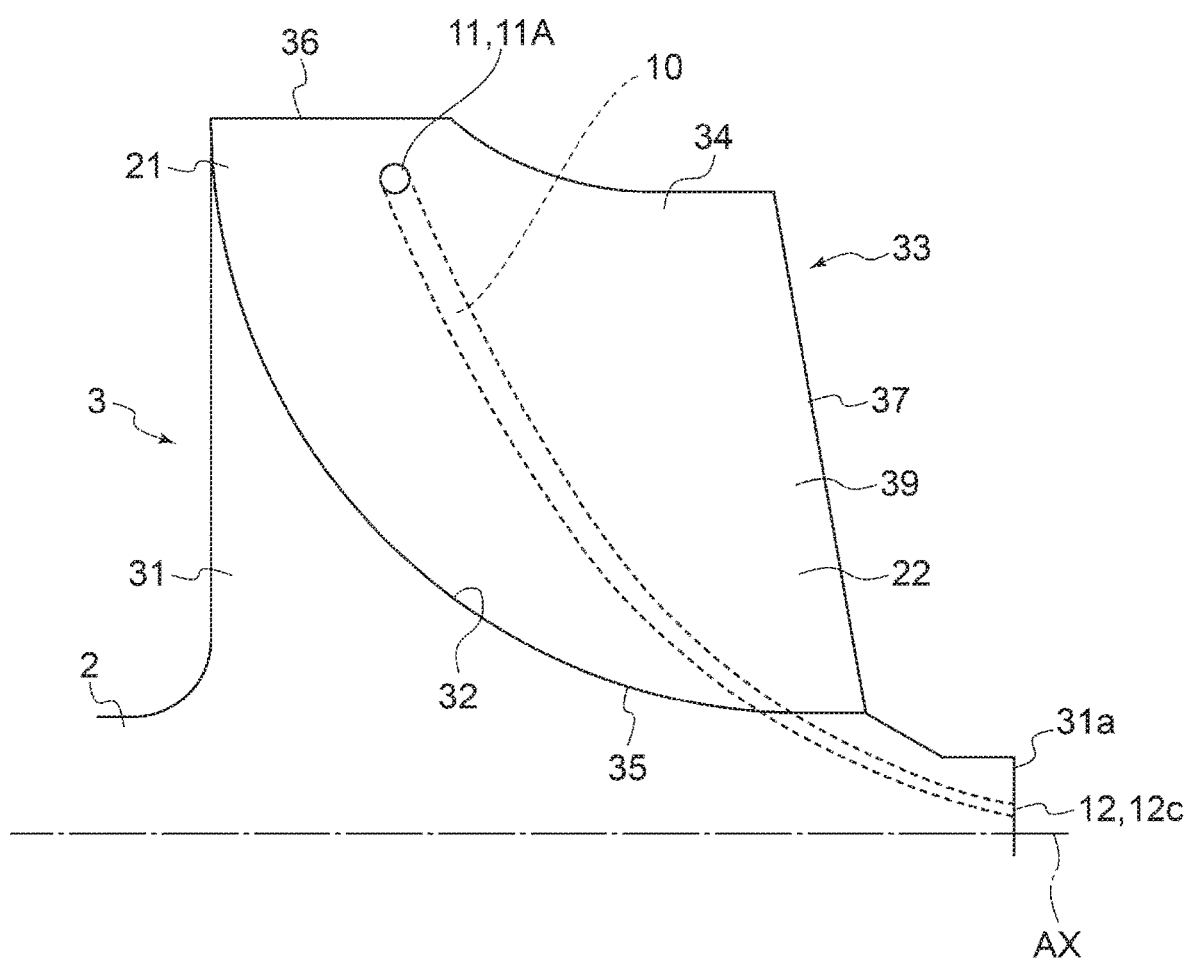
FIG. 10 is a schematic diagram showing the shape of a rotor blade 33 according to an embodiment.

FIG. 5 is a schematic diagram showing the meridional shape of the rotor blade 33 according to an embodiment. FIG. 6 schematically shows the rotor blade 33 according to the embodiment shown in FIG. 5 in a cross-section along the connection passage 10, where two rotor blades 33 adjacent to each other are depicted. FIGS. 7 to 9 schematically show the rotor blade 33 according to some embodiments in a cross-section along the connection passage 10. FIG. 10 is a schematic diagram showing the meridional shape of the rotor blade 33 according to another embodiment.

In FIG. 5, the arrow G indicates the direction of main flow of exhaust gas.

In a meridional plane, "spanwise direction" is defined as a direction along the straight line passing through first and second positions when, as shown in FIG. 5, Lt is the entire length of a tip portion (tip) 34 of the rotor blade 33, Lb is the entire length of a base portion (connection position with the hub surface 32) 35 of the rotor blade 33, the first position is a position on the tip portion 34 of the rotor blade 33 a predetermined distance Lt1 away from the leading edge 36, and the second position is a position on the base portion 35 of the rotor blade 33 a predetermined distance Lb1 away from the leading edge 36, where Lb1=Lb×Lt1/Lt. In FIG. 5, an example of line S along the spanwise direction is shown by the dashed-dotted line. The line S shown in FIG. 5 indicates the position where variable m, which is described later, is 0.5.

Also, in a meridional plane, "meridional line" is defined as a line at constant height in the spanwise direction from the leading edge 36 to the trailing edge 37 of the rotor blade 33. In FIG. 5, an example of meridional line M is shown by the dashed-dotted line. The meridional line M shown in FIG. 5 is a line at the middle height between the tip portion 34 and the base portion 35 in the spanwise direction, that is, a line at the spanwise center.

In some embodiments shown in FIGS. 5 to 10, the turbine rotor blade 3 includes the first opening 11 disposed in the rotor blade 33, the second opening 12 disposed downstream of the first opening 11 with respect to the exhaust gas main flow in the turbine rotor blade 3, and the connection passage 10 disposed inside the turbine rotor blade 3 and connecting the first opening 11 and the second opening 12.

Thus, in some embodiments, the first opening 11 disposed in the rotor blade 33 and the second opening 12 disposed downstream of the first opening 11 in the turbine rotor blade 3 are connected by the connection passage 10 inside the turbine rotor blade 3. Further, since the second opening 12 is disposed downstream of the first opening 11, the pressure of exhaust gas in the first opening 11 is higher than the pressure of exhaust gas in the second opening 12. Accordingly, exhaust gas in the vicinity of the first opening 11 is taken through the first opening 11 and discharged through the second opening 12 via the connection passage 10. Therefore, as exhaust gas in the vicinity of the first opening 11 is taken through the first opening 11, separation of exhaust gas from the blade surface in the vicinity of the first opening 11 is suppressed. Consequently, it is possible to suppress a reduction in turbine efficiency regardless of the theoretical velocity ratio U/C0.

Further, since the turbocharger 1 according to some embodiments includes any of the turbine rotor blades 3 according to some embodiment shown in FIGS. 5 to 10, it is possible to suppress a reduction in turbine efficiency of the turbocharger 1.

In some embodiments shown in FIGS. 5 to 9, when the rotor blade 33 is nominally divided at the center position on the meridional line M, into a part with the leading edge 36 defined as a leading-edge-side region 21, and the remainder with the trailing edge 37 defined as a trailing-edge-side region 22, the first opening 11 is disposed in the leading-edge-side region 21 of the rotor blade 33, and the second opening 12 is disposed in the trailing-edge-side region 22 of the rotor blade 33.

In FIG. 5, the center position on the meridional line M of the rotor blade 33 coincides with the position of the line S shown in FIG. 5.

The separation of exhaust gas from the blade surface due to the change in theoretical velocity ratio U/C0 is likely to occur in the vicinity the leading edge 36 of the rotor blade 33. In this regard, in some embodiments shown in FIGS. 5 to 9, since the first opening 11 is disposed in the leading-edge-side region 21, it is possible to suppress separation of exhaust gas from the blade surface in the leading-edge-side region 21. Further, since the second opening 12 is disposed in the trailing-edge-side region 22, the pressure of exhaust gas in the second opening 12 is reduced compared with the case where the second opening 12 is disposed in the leading-edge-side region 21 of the rotor blade 33, so that the difference in pressure from the first opening 11 increases. Thus, exhaust gas taken through the first opening 11 is effectively discharged from the second opening 12.

If the second opening 12 is disposed in the leading-edge-side region 21 of the rotor blade 33, exhaust gas discharged from the second opening 12 may promote separation of exhaust gas from the blade surface in the leading-edge-side region 21. However, in the above configuration, since the second opening 12 is disposed in the trailing-edge-side region 22 of the rotor blade 33, it is possible to prevent exhaust gas discharged from the second opening 12 from promoting separation of exhaust gas from the blade surface in the leading-edge-side region 21.

In some embodiments shown in FIGS. 5 to 9, the connection passage 10 is disposed inside the rotor blade 33.

In the embodiment shown in FIG. 8, the second opening 12 includes an edge surface opening 12B disposed on an edge surface 37a of the trailing edge 37 of the rotor blade 33.

On the downstream side of the trailing edge 37 along the flow of exhaust gas, loss may occur due to wake which may oscillate the trailing edge 37 of the rotor blade 33, called wake flow.

In this regard, in the embodiment shown in FIG. 8, since the second opening 12 includes the edge surface opening 12B disposed on the edge surface 37a of the trailing edge 37 of the rotor blade 33, development of the wake flow is prevented by exhaust gas discharged from the edge surface opening 12B. Thus, it is possible to suppress the occurrence of wake.

The turbine rotor blade 3 according to the embodiment shown in FIG. 6 includes at least a first rotor blade 33A and a second rotor blade 33B adjacent to the suction side 39 of the first rotor blade 33A. In the turbine rotor blade 3 according to the embodiment shown in FIG. 6, the second opening 12 includes a blade surface opening 12A disposed on a blade surface on the suction side 39 of the first rotor blade 33A at a position adjacent to the trailing edge 37 with respect to a throat portion 23 at which the suction side 39 of the first rotor blade 33A is closest to the pressure side 38 of the second rotor blade 33B.

In other words, as shown in FIG. 6, in the first rotor blade 33A and the second rotor blade 33B adjacent to each other, the suction side 39 of the first rotor blade 33A and the pressure side 38 of the second rotor blade 33B face each other. A region where the distance between the suction side 39 of the first rotor blade 33A and the pressure side 38 of the second rotor blade 33B is closest is referred to as the throat portion 23 as described above. In the turbine rotor blade 3 according to the embodiment shown in FIG. 6, the blade surface opening 12A is disposed on a blade surface on the suction side 39 of the first rotor blade 33A at a position adjacent to the trailing edge 37 with respect to the throat portion 23.

In the embodiment shown in FIG. 6, the throat portion 23 is a region between the suction side 39 of the first rotor blade 33A and the trailing edge 37 of the second rotor blade 33B.

At the blade surface on the suction side 39 adjacent to the trailing edge 37 with respect to the throat portion 23, exhaust gas easily separates from the blade surface. When exhaust gas separates from the blade surface on the suction side 39 adjacent to the trailing edge 37 with respect to the throat portion 23, the occurrence of wake may be enhanced, and loss may increase.

In this regard, in the embodiment shown in FIG. 6, since the second opening 12 includes the blade surface opening 12A disposed on a blade surface on the suction side 39 of the first rotor blade 33A at a position adjacent to the trailing edge 37 with respect to the throat portion 23 at which the first rotor blade 33A is closest to the pressure side 38 of the second rotor blade 33B, it is possible to suppress separation of exhaust gas from the blade surface on the suction side 39 adjacent to the trailing edge 37 with respect to the throat portion 23 by exhaust gas discharged from the blade surface opening 12A. Thus, it is possible to suppress the occurrence of wake.

In the following description, unless it is necessary to distinguish the blade surface opening 12A, the edge surface opening 12B, and a tip surface opening 12C described later, the alphabet at the end of the reference numeral is omitted, and the they are simply referred to as the second opening 12.

In the embodiment shown in FIG. 9, the second opening 12 includes the blade surface opening 12A and the edge surface opening 12B.

In the embodiment shown in FIG. 9, since the second opening 12 includes the blade surface opening 12A, it is possible to suppress separation of exhaust gas from the blade surface on the suction side 39 adjacent to the trailing edge 37 with respect to the throat portion 23 by exhaust gas discharged from the blade surface opening 12A. Thus, it is possible to suppress the occurrence of wake.

Further, in the embodiment shown in FIG. 9, since the second opening 12 includes the edge surface opening 12B, it is possible to further suppress the occurrence of wake by exhaust gas discharged from the edge surface opening 12B.

In some embodiments shown in FIGS. 5 to 9, the second opening 12 is disposed in the trailing-edge-side region 22 of the rotor blade 33, as described above. Further, in some embodiments shown in FIGS. 5 to 9, as shown in FIG. 5, the second opening 12 is formed at a position closer to the hub surface 32 (see FIGS. 2 and 10) than the spanwise center position of the rotor blade 33 is to the hub surface, i.e., at a position adjacent to the base portion 35 with respect to the spanwise center position of the rotor blade 33.

In FIG. 5, the spanwise center position coincides with the position of the meridional line M shown in FIG. 5.

Generally, the thickness of the rotor blade 33 increases toward the hub surface 32 along the spanwise direction. Thus, the wake flow is likely to occur near the hub surface 32 in the spanwise direction on the downstream side of the trailing edge 37 with respect to the exhaust gas flow.

In this regard, in some embodiments shown in FIGS. 5 to 9, as shown in FIG. 5, since the second opening 12 is formed at a position closer to the hub surface 32 than the spanwise center position of the rotor blade 33 is in the trailing-edge-side region 22, development of the wake flow is prevented by exhaust gas discharged from the second opening 12. Thus, it is possible to effectively suppress the occurrence of wake.

In the embodiment shown in FIG. 10, the first opening 11 is disposed in the leading-edge-side region 21 of the rotor blade 33, and the second opening 12 is disposed on the tip surface 31a of the hub 31. In other words, in the embodiment shown in FIG. 10, the connection passage 10 is disposed inside the rotor blade 33 and inside the hub 31.

On the downstream side of the tip surface 31a of the hub 31, exhaust gas flowing along the rotor blade 33 flows so as to wrap around the tip surface 31a of the hub 31, so that the wake is more likely to occur.

In this regard, in the embodiment shown in FIG. 10, since the second opening 12 is formed on the tip surface 31a of the hub 31, it is possible to effectively suppress the occurrence of wake by exhaust gas discharged from the second opening 12.

The second opening 12 in the embodiment shown in FIG. 10 is also referred to as a tip surface opening 12C.

In some embodiments shown in FIGS. 5, 6, and 8 to 10, the first opening 11 is formed on a blade surface on the suction side 39 of the rotor blade 33.

As the theoretical velocity ratio U/C0 decreases, the relative flow of exhaust gas inclines toward the pressure side 38, so that separation from the blade surface easily occurs on the suction side 39.

In this regard, in some embodiments shown in FIGS. 5, 6, and 8 to 10, since the first opening 11 is formed on a blade surface on the suction side 39 of the rotor blade 33, it is possible to effectively suppress separation of exhaust gas from the blade surface on the suction side 39.

The first opening 11 formed on the blade surface on the suction side 39 is also referred to as a suction-side opening 11A.

In the following description, unless it is necessary to distinguish the suction-side opening 11A and a pressure-side opening 11B described later, the alphabet at the end of the reference numeral is omitted, and the they are simply referred to as the first opening 11.

In the embodiment shown in FIG. 7, the first opening 11 is formed on a blade surface on the pressure side 38 of the rotor blade 33.

As the theoretical velocity ratio U/C0 increases, the relative flow of exhaust gas inclines toward the suction side 39, so that separation from the blade surface easily occurs on the pressure side 38.

In this regard, in the embodiment shown in FIG. 7, since the first opening 11 is formed on a blade surface on the pressure side 38 of the rotor blade 33, it is possible to effectively suppress separation of exhaust gas from the blade surface on the pressure side 38.

The first opening 11 formed on a blade surface on the pressure side 38 is also referred to as a pressure-side opening 11B.

In some embodiments shown in FIGS. 5 to 10, the first opening 11 is disposed in the leading-edge-side region 21 of the rotor blade 33, as described above. Further, in some embodiments shown in FIGS. 5 to 10, as shown in FIGS. 5 and 10, the first opening 11 is formed at a position farther from the hub surface 32 than the spanwise center position of the rotor blade 33, i.e., at a position adjacent to the tip portion 34 with respect to the spanwise center position of the rotor blade 33.

It is known that separation of exhaust gas entering the turbine rotor blade 3 in the vicinity of the leading edge 36 is more likely to occur with distance from the hub surface 32 along the spanwise direction.

In this regard, in some embodiments shown in FIGS. 5 to 10, as shown in FIGS. 5 and 10, since the first opening 11 is formed at a position farther from the hub surface 32 than the spanwise center position of the rotor blade 33 in the leading-edge-side region 21, it is possible to effectively suppress separation of exhaust gas in the vicinity of leading edge 36.

In some embodiments shown in FIGS. 5 to 10, the opening area of the first opening 11 is larger than the opening area of the second opening 12.

In order to effectively suppress separation of exhaust gas entering the turbine rotor blade 3 in the vicinity of the leading edge 36, it is preferred that the first opening 11 has a large opening area. However, when the first opening 11 has a large opening area, more exhaust gas flows from the first opening 11 into the connection passage 10. As a result, exhaust gas that does not provide kinetic energy to the turbine rotor blade 3 may increase, and the turbine efficiency may decrease.

In this regard, in some embodiments shown in FIGS. 5 to 10, since the opening area of the first opening 11 is larger than the opening area of the second opening 12, i.e., the opening area of the second opening 12 is smaller than the opening area of the first opening 11, it is possible to reduce the flow rate of exhaust gas flowing from the first opening 11 into the connection passage 10, compared with the case where the opening area of the second opening 12 is equal to the opening area of the first opening 11. Accordingly, since the flow rate of exhaust gas flowing from the first opening 11 into the connection passage 10 is reduced while effectively suppressing separation of exhaust gas entering the turbine rotor blade 3 in the vicinity of the leading edge 36, it is possible to effectively suppress a reduction in turbine efficiency.

As long as the opening area of the first opening 11 is larger than the opening area of the second opening 12, the connection passage 10 may have an inner diameter gradually decreasing from the first opening 11 to the second opening 12 as shown in FIGS. 5 and 10, for instance, or may have a constant inner diameter in at least a part of the section between the first opening 11 and the second opening 12.

Further, even if the opening area of the second opening 12 is larger than the opening area of the first opening 11, the flow rate of exhaust gas flowing from the first opening 11 into the connection passage 10 can be reduced by, for instance, decreasing the flow passage area of at least a part of the connection passage 10.

The orientation of the first opening 11 may be perpendicular to a blade surface on which the first opening 11 is formed, or may be inclined so as to be directed upstream in the main flow direction (see arrow G in FIG. 5) of exhaust gas flowing along the blade surface in the vicinity of the first opening 11. Further, since the separation flow separated from the blade surface flows along the blade surface toward the leading edge 36 as shown by the arrow 42A in FIG. 3 or the arrow 42B in FIG. 4, the orientation may be inclined so as to be directed upstream in the separation flow direction, i.e., downward in FIGS. 3 and 4, in order to efficiently inhale the separation flow.

The orientation of the blade surface opening 12A may be perpendicular to a blade surface on which the blade surface opening 12A is formed, or may be inclined so as to be directed downstream in the main flow direction (see arrow G in FIG. 5) of exhaust gas flowing along the blade surface in the vicinity of the blade surface opening 12A.

Here, for instance, a position on the blade surface along the meridional line M (see FIG. 5) is represented by variable m such that the position corresponding to the leading edge 36 along the meridional line M is m=0, and the position corresponding to the trailing edge 37 along the meridional line M is m=1.0.

The leading-edge-side region 21 is a region on the leading edge 36 side with respect to the center position of the rotor blade 33 on the meridional line M, i.e., position of m=0.5, as described above. Accordingly, the range of the leading-edge-side region 21 is represented by 0<m<0.5.

The trailing-edge-side region 22 is a region on the trailing edge 37 side with respect to the center position of the rotor blade 33 on the meridional line M, i.e., position of m=0.5, as described above. Accordingly, the range of the trailing-edge-side region 22 is represented by 0.5<m<1.0.

As described above, the line S shown in FIG. 5 is the position where m=0.5.

As described above, in some embodiments shown in FIGS. 5 to 10, the first opening 11 is disposed in the leading-edge-side region 21 of the rotor blade 33. Accordingly, the position of the first opening 11 is represented by 0<m<0.5.

As shown by the arrow 42A in FIG. 3 or the arrow 42B in FIG. 4, it is known that the separation flow separated from the blade surface is more likely occur near the leading edge 36 in the leading-edge-side region 21. Thus, when the first opening 11 is formed in a range of, for example, 0<m<0.3, it is possible to effectively suppress the separation flow as indicated by the arrow 42A in FIG. 3 or the arrow 42B in FIG. 4.

(Method for Producing Turbine Rotor Blade 3)

The turbine rotor blade 3 according to the above-described embodiments can be produced by irradiating metallic powder with laser and depositing layers of metallic powder using an apparatus called a metal 3D printer. In this producing method, metallic powder is locally melted by laser and then solidified to form layers of metallic powder. That is, the method for producing the turbine rotor blade according to some embodiments is to integrally form the hub 31 and the rotor blade 33 in which at least a part of the connection passage 10 is disposed, by additive manufacturing using metallic powder.

The metal additive manufacturing method of additive manufacturing with metallic powder may be, for example, laser sintering method or laser melting method.

As described above, the turbocharger 1 according to some embodiments is a compact turbocharger for a vehicle such as an automobile, and the diameter of the turbine rotor blade 3 according to some embodiment is about 20 mm or more and 70 mm or less, for example. Conventionally, a turbine rotor blade of this size has been manufactured by casting.

On the other hand, Patent Documents 2 to 4 described above disclose techniques for producing a turbine blade of an axial-flow turbine of a gas turbine or a steam turbine by the metal additive manufacturing method. However, the inventions disclosed in these documents relate to production of a turbine blade of an axial-flow turbine with the metal additive manufacturing method, but do not disclose that the entire axial-flow turbine including a rotor is produced in an integrated manner. Conventionally, a turbine rotor blade of a radial turbine or a mixed flow turbine used in a compact turbocharger for a vehicle such as an automobile has not been manufactured by integrally forming a hub and a blade by the metal additive manufacturing method.

For instance, when a turbine rotor blade is produced by precision casting, wax is injected into a mold to produce a wax model. Since the wax model needs to be removed from the mold, a passage corresponding to the connection passage cannot be provided inside the part of the wax model corresponding to the rotor blade so as to extend in a direction intersecting a direction in which the mold is detached. Accordingly, it is difficult to produce the turbine rotor blade 3 having the connection passage 10 connecting the first opening 11 and the second opening 12, as with the turbine rotor blade 3 according to the above-described embodiments, by precision casting.

In this regard, when the hub 31 and the rotor blade 33 in which at least a part of the connection passage 10 is disposed are integrally formed by additive manufacturing with metallic powder, the turbine rotor blade 3 according to the above-described embodiments can be produced.

In the case where the turbine rotor blade 3 according to the above-described embodiments is integrally formed by the metal additive manufacturing method, the turbine rotor blade 3 is produced by depositing layers of metallic powder sequentially from left to right in FIGS. 5 and 10. Specifically, in the case where the turbine rotor blade 3 according to the above-described embodiments is integrally formed by the metal additive manufacturing method, the attitude of the turbine rotor blade 3 is such that the trailing edge 37 faces upward in FIGS. 5 and 10, and the extending direction of the axis AX coincides with the vertical direction. Accordingly, in the case where the turbine rotor blade 3 according to the above-described embodiments is integrally formed by the metal additive manufacturing method, the line h perpendicular to the axis AX shown in FIG. 5 extends in the horizontal direction.

In additive manufacturing with metallic powder, since layers of metallic powder are deposited from the bottom gradually, it is difficult to form an overhang portion. Accordingly, it is difficult to form a cavity extending in the horizontal direction. Therefore, in the turbine rotor blade 3 according to the above-described embodiments, as shown in FIG. 5, the connection passage 10 is provided such that the extending direction of the connection passage 10, i.e., the extending direction of the center line C of the connection passage 10 intersects the line h which is horizontal during manufacturing.

According to findings of the present inventors, in the case of producing the turbine rotor blade 3 by the metal additive manufacturing method, if the inner diameter of the connection passage 10 is smaller than a certain inner diameter, the connection passage 10 may collapse. Further, according to findings of the present inventors, in the case of producing the turbine rotor blade 3 by the metal additive manufacturing method, if the inner diameter of the connection passage 10 is larger than a certain inner diameter, the cross-sectional shape of the connection passage 10 around the center line C may be distorted.

Therefore, according to findings of the present inventors, when the material of the turbine rotor blade 3 is an aluminum-based material, the inner diameter of the connection passage 10 is preferably 0.3 mm or more and 3.0 mm or less.

The present invention is not limited to the embodiments described above, but includes modifications to the embodiments described above, and embodiments composed of combinations of those embodiments.

For instance, although in the turbine rotor blade 3 according to the above-described embodiments, one connection passage 10 is provided in one rotor blade 33, two or more sets of the first opening 11, the second opening 12, and the connection passage 10 may be provided in one rotator blade 33. In this case, two or more sets of the first opening 11, the second opening 12, and the connection passage 10 according to any one of the embodiments shown in FIGS. 6 to 10 may be provided, or two or more sets of the first opening 11, the second opening 12, and the connection passage 10 according to different embodiments shown in FIGS. 6 to 10 may be provided in combination.

Further, a plurality of first openings 11 may be provided in one rotor blade 33, and the plurality of first openings 11 may be connected to one connection passage 10.

Further, a plurality of blade surface openings 12A may be provided in one rotor blade 33, and the plurality of blade surface openings 12A may be connected to one connection passage 10, or a plurality of edge surface openings 12B may be provided in one rotor blade 33, and the plurality of edge surface openings 12B may be connected to one connection passage 10.

The connection passage 10 according to the above-described embodiments is not necessarily disposed in all rotor blades 33 of the turbine rotor blade 3, and may be disposed in at least one rotor blade 33.

Further, the position, size, and number of first openings 11 may vary with individual rotor blades 33. Similarly, the position, size, and number of second openings 12 may vary with individual rotor blades 33. Further, the formation position and number of connection passage 10 may vary with individual rotor blades 33.

REFERENCE SIGNS LIST

1 Turbocharger
2 Rotor shaft
3 Turbine wheel (turbine rotor blade)
4 Compressor wheel
10 Connection passage
11 First opening
12 Second opening
12A Blade surface opening
12B Edge surface opening
21 Leading-edge-side region
22 Trailing-edge-side region
23 Throat portion
31 Hub
32 Hub surface
33 Rotor blade
33A First rotor blade
33B Second rotor blade
34 Tip portion (Tip)
35 Base portion
36 Leading edge
37 Trailing edge
37a Edge surface
38 Pressure side
39 Suction side

The invention claimed is:

1. A turbine rotor blade to be connected to a rotational shaft so as to be rotatable around an axis, comprising:
a hub having a hub surface inclined with respect to the axis in a cross-section along the axis;
at least one rotor blade disposed on the hub surface; and
a connection passage disposed inside the at least one rotor blade and connecting a first opening disposed in the at least one rotor blade and a second opening disposed downstream of the first opening in the at least one rotor blade,
wherein the second opening includes an edge surface opening disposed on an edge surface of a trailing edge of the at least one rotor blade.

2. A turbine rotor blade to be connected to a rotational shaft so as to be rotatable around an axis, comprising:
a hub having a hub surface inclined with respect to the axis in a cross-section along the axis;
at least one rotor blade disposed on the hub surface; and
a connection passage disposed inside the at least one rotor blade and connecting a first opening disposed in the at least one rotor blade and a second opening disposed downstream of the first opening in the at least one rotor blade,
wherein the at least one rotor blade includes a first rotor blade and a second rotor blade adjacent to a suction side of the first rotor blade, and
wherein the second opening includes a blade surface opening disposed on a blade surface on the suction side of the first rotor blade at a position adjacent to a trailing edge of the first rotor blade with respect to a throat portion at which the first rotor blade is closest to a pressure side of the second rotor blade.

3. The turbine rotor blade according to claim 2,
wherein the second opening includes an edge surface opening disposed on an edge surface of a trailing edge of the at least one rotor blade, and the blade surface opening.

4. The turbine rotor blade according to claim 2,
wherein when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the second opening is disposed in the trailing-edge-side region of the rotor blade, and
wherein the second opening is disposed at a position closer to the hub surface than a spanwise center position of the rotor blade.

5. The turbine rotor blade according to claim 2,
wherein the first opening is formed on a blade surface on a suction side of the at least one rotor blade.

6. The turbine rotor blade according to claim 2,
wherein the first opening is formed on a blade surface on a pressure side of the at least one rotor blade.

7. The turbine rotor blade according to claim 2,
wherein when a part of the at least one rotor blade on a leading edge side with respect to a center position on a meridional line of the rotor blade is defined as a leading-edge-side region, and a remaining part of the rotor blade on a trailing edge side is defined as a trailing-edge-side region, the first opening is disposed in the leading-edge-side region of the rotor blade, and
wherein the first opening is disposed at a position farther from the hub surface than a spanwise center position of the rotor blade.

8. The turbine rotor blade according to claim 2,
wherein an opening area of the first opening is larger than an opening area of the second opening.

9. A turbine rotor blade to be connected to a rotational shaft so as to be rotatable around an axis, comprising:
a hub having a hub surface inclined with respect to the axis in a cross-section along the axis;
at least one rotor blade disposed on the hub surface; and
a connection passage disposed inside the at least one rotor blade and connecting a first opening disposed in the at least one rotor blade and a second opening disposed on a tip surface of the hub,
wherein when a part of the at least one rotor blade on a leading edge side with respect to a center position on a meridional line of the rotor blade is defined as a leading-edge-side region, and a remaining part of the rotor blade on a trailing edge side is defined as a trailing-edge-side region,
the first opening is disposed in the leading-edge-side region of the rotor blade.

* * * * *